(12) United States Patent
Gottschlich et al.

(10) Patent No.: US 9,864,649 B2
(45) Date of Patent: Jan. 9, 2018

(54) TECHNOLOGIES FOR ROOT CAUSE IDENTIFICATION OF USE-AFTER-FREE MEMORY CORRUPTION BUGS

(71) Applicant: Intel Corporation, Santa Clara, CA (US)

(72) Inventors: Justin E. Gottschlich, Santa Clara, CA (US); Gilles A. Pokam, Fremont, CA (US); Cristiano L. Pereira, Groveland, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 14/670,863

(22) Filed: Mar. 27, 2015

(65) Prior Publication Data

US 2016/0283302 A1  Sep. 29, 2016

(51) Int. Cl.
*G06F 11/00* (2006.01)
*G06F 11/07* (2006.01)

(52) U.S. Cl.
CPC ......... *G06F 11/079* (2013.01); *G06F 11/073* (2013.01)

(58) Field of Classification Search
CPC .................................................... G06F 11/079
See application file for complete search history.

(56) References Cited

U.S. PATENT DOCUMENTS

| 5,491,808 | A  | * | 2/1996  | Geist, Jr. ............. | G06F 11/3495 |
|           |    |   |         |                          | 707/999.202  |
| 8,762,797 | B2 | * | 6/2014  | Serebryany ........... | G06F 11/073  |
|           |    |   |         |                          | 714/702      |
| 9,047,185 | B2 | * | 6/2015  | Erdmann ............   | G06F 11/0727 |
| 9,189,318 | B2 | * | 11/2015 | Li ...........................| G06F 11/07   |
| 2004/0168162 | A1 |  | 8/2004  | Park                   |              |
| 2007/0250820 | A1 |  | 10/2007 | Edwards                |              |

(Continued)

OTHER PUBLICATIONS

Nagarakatte et al., "WatchdogLite: Hardware-Accelerated Compiler-Based Pointer Checking", CGO '14, Feb. 15-19, 2014, pp. 175-184.

(Continued)

*Primary Examiner* — Christopher McCarthy
(74) *Attorney, Agent, or Firm* — Barnes & Thornburg LLP

(57) ABSTRACT

Technologies for identification of a potential root cause of a use-after-free memory corruption bug of a program include a computing device to replay execution of the execution of the program based on an execution log of the program. The execution log comprises an ordered set of executed instructions of the program that resulted in the use-after-free memory corruption bug. The computing device compares a use-after-free memory address access of the program to a memory address associated with an occurrence of the use-after-free memory corruption bug in response to detecting the use-after-free memory address access and records the use-after-free memory address access of the program as a candidate for a root cause of the use-after-free memory corruption bug to a candidate list in response to detecting a match between the use-after-free memory address access of the program and the memory address associated with the occurrence of the use-after-free memory corruption bug.

21 Claims, 6 Drawing Sheets

(56) References Cited

U.S. PATENT DOCUMENTS

| | | | | |
|---|---|---|---|---|
| 2010/0131796 | A1* | 5/2010 | Engelbrecht | G06F 9/30145 714/15 |
| 2013/0152053 | A1* | 6/2013 | Cui | G06F 11/3672 717/127 |
| 2014/0013091 | A1* | 1/2014 | Yasin | G06F 11/3466 712/244 |
| 2014/0089642 | A1* | 3/2014 | Gottschlich | G06F 11/3664 712/220 |
| 2014/0281274 | A1 | 9/2014 | Pokam et al. | |
| 2014/0344633 | A1* | 11/2014 | Li | G06F 11/3604 714/57 |
| 2014/0380102 | A1* | 12/2014 | Lindo | G06F 11/3624 714/38.11 |
| 2015/0026669 | A1* | 1/2015 | Eddington | G06F 8/51 717/137 |
| 2015/0081844 | A1 | 3/2015 | Jiang et al. | |
| 2015/0161396 | A1* | 6/2015 | Hentunen | G06F 21/54 726/25 |
| 2015/0227414 | A1* | 8/2015 | Varma | G06F 11/073 714/47.1 |
| 2016/0026791 | A1* | 1/2016 | Melski | G06F 21/54 726/25 |
| 2016/0239216 | A1* | 8/2016 | Kilner | G06F 3/0608 |
| 2016/0283300 | A1* | 9/2016 | Stark | G06F 11/1064 |

OTHER PUBLICATIONS

"Intel Inspector", downloaded from https://software.intel.com/en-us/intel-inspector-xe, retrieved Dec. 29, 2015.

Novark et al., "Exterminator: Automatically Correcting Memory Errors with High Probability", Communications of the ACM, Dec. 2008, vol. 51, No. 12, pp. 87-95.

Pokam et al., "QuickRec: Prototyping an Intel Architecture Extension for Record and Replay of Multithreaded Programs", 2013 ACM 978-1-4503-2079-5/13/06, 12 pages.

Luk et al., "Pin: Building Customized Program Analysis Tools with Dynamic Instrumentation", 2005 ACM 1-59593-080-9/05/0006, 11 pages.

"Intel MPX", downloaded from https://en.wikipedia.org/wiki/Intel_MPX, retrieved Jan. 12, 2016.

International Search Report for PCT/US16/019586, dated Jul. 11, 2016 (4 pages).

Written Opinion for PCT/US16/019586, dated Jul. 11, 2016 (7 pages).

Satish Narayanasamy,'BugNet: Continuously Recording Program Execution for Deterministic Replay Debugging,' In: Proceeding of the 32nd International Symposium on Computer Architecture ( ISCA' 05). Jun. 2005. section 4.1.

Michiel Ronsse, 'RecPlay: A fully Integrated Practical Record/Replay System,' ACM Transactions on Computer Systems (TOCS) vol. 17, No. 2 pp. 113-125.

KMR Audenaer, 'Interrupt Replay: a debugging method fro parallel programs with interrupts,' Microprocessors and Microsystems, vol. 18 No. 10 pp. Dec. 1994 pp. 601-612.

* cited by examiner

TECHNOLOGIES FOR ROOT CAUSE IDENTIFICATION OF USE-AFTER-FREE MEMORY CORRUPTION BUGS

BACKGROUND

It is notoriously challenging to identify memory corruption bugs and even more challenging to identify the root cause of those bugs. For example, use-after-free memory corruption bugs result from a pointer to memory being used after the memory has been freed (i.e., deleted). Although the use-after-free bug may sometimes cause the computing device to crash, the computing device will oftentimes continue to execute. As such, it is quite difficult, if not impossible, for a programmer to detect the existence of some use-after-free bugs using common software techniques (e.g., unit or integration testing).

Some debugging systems permit programmers to catch the use of the deleted memory resulting in the observance of a use-after-free bug. However, the identification of the root cause of the use-after-free bug in such systems is significantly limited or entirely absent. As such, the root cause typically remains, which may introduce inconsistent behavior and/or security vulnerabilities to the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
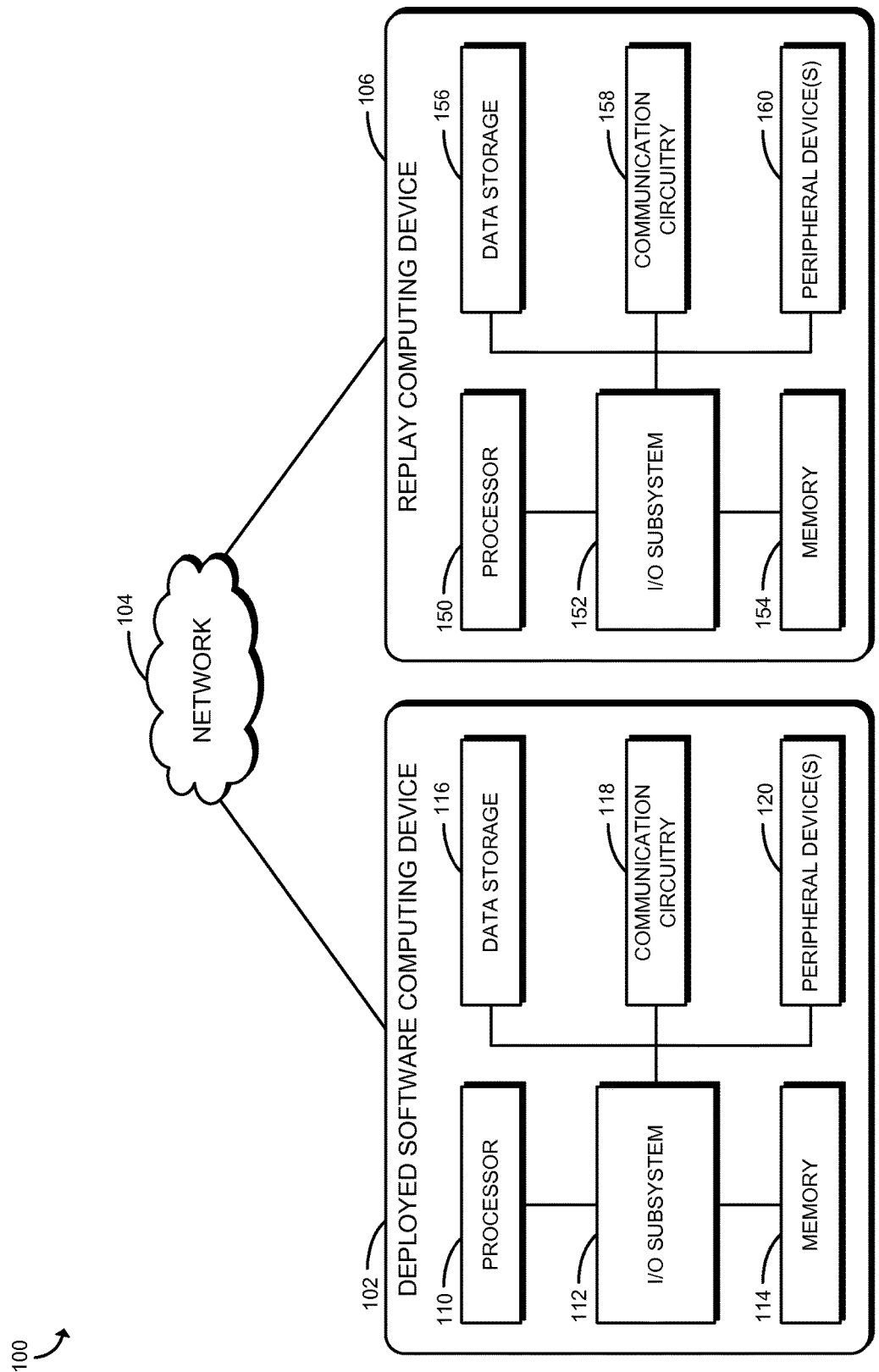
FIG. 1 is a simplified block diagram of at least one embodiment of a system for identifying the root cause of use-after-free memory corruption bugs.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for identifying the root cause of use-after-free memory corruption bugs includes a deployed software computing device 102, a network 104, and a replay computing device 106. Although only one deployed software computing device 102, one network 104, and one replay computing device 106 are illustratively shown in FIG. 1, the system 100 may include any number of deployed software computing devices 102, networks 104, and/or replay computing devices 106 in other embodiments. Further, in some embodiments, the deployed software computing device 102 and the replay computing device 106 may be embodied as the same computing device.

As described in detail below, the system 100 identifies and filters the potential root causes of use-after-free memory corruption bugs. In doing so, in the illustrative embodiment, the deployed software computing device 102 executes a software program and records the execution of the program to an execution log. The deployed software computing device 102 monitors the execution of the program for an occurrence of use-after-free memory corruption bugs and records the memory address associated with the occurrence of the use-after-free memory corruption bug to a memory log. The replay computing device 106 receives the execution log and the memory log from the deployed software computing device 102 for replay and root cause identification. The replay computing device 106 replays execution of the program based on the received execution log. Further, the replay computing device 106 compares the memory address accesses of the program to a memory address associated with an occurrence of the use-after-free memory corruption bug (e.g., from the memory log) and records the memory address access (e.g., to a candidate list) as a candidate for the root cause of the use-after-free bug if there is a match. The replay computing device 106 may further filter the candidate list to reduce the number of potential root causes of the use-after-free bug (e.g., to automatically remove false positives). It should be appreciated that doing so may significantly reduce the work required by a programmer to identify the root cause of the use-after-free bug.

The illustrative deployed software computing device 102 may be embodied as any type of computing device capable of performing the functions described herein. For example, the deployed software computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative deployed software computing device 102 includes a processor 110, an input/output ("I/O") subsystem 112, a memory 114, a data storage 116, a communication circuitry 118, and one or more peripheral devices 120. Of course, the deployed software computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the deployed software computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the deployed software computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the deployed software computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the deployed software computing device 102 useful for performing the functions described herein. For example, the deployed software computing device 102 may record data to the execution log 210 and the memory log 212 as described herein.

The communication circuitry 118 may be embodied as any communication circuit, device, or collection thereof, capable of enabling communications between the deployed software computing device 102 and other remote devices over the network 104 (e.g., the replay computing device 106). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the deployed software computing device 102.

The network 104 may be embodied as any type of communication network capable of facilitating communication between the deployed software computing device 102 and the replay computing device 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The replay computing device 106 may be embodied as any computing device capable of performing the functions described herein. For example, the replay computing device 106 may be embodied as a cellular phone, smartphone, wearable computing device, personal digital assistant, mobile Internet device, laptop computer, tablet computer, notebook, netbook, Ultrabook™, desktop computer, server, router, switch, Hybrid device, and/or any other computing/communication device.

As shown in FIG. 1, the illustrative replay computing device 106 includes a processor 150, an input/output ("I/O") subsystem 152, a memory 154, a data storage 156, a communication circuitry 158, and one or more peripheral devices 160. Of course, the replay computing device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. In some embodiments, the components of the replay computing device 106 are similar to the corresponding components of the deployed software computing device 102 described above. As such, the description of those components is not repeated herein for clarity of the description.

Figure 2:
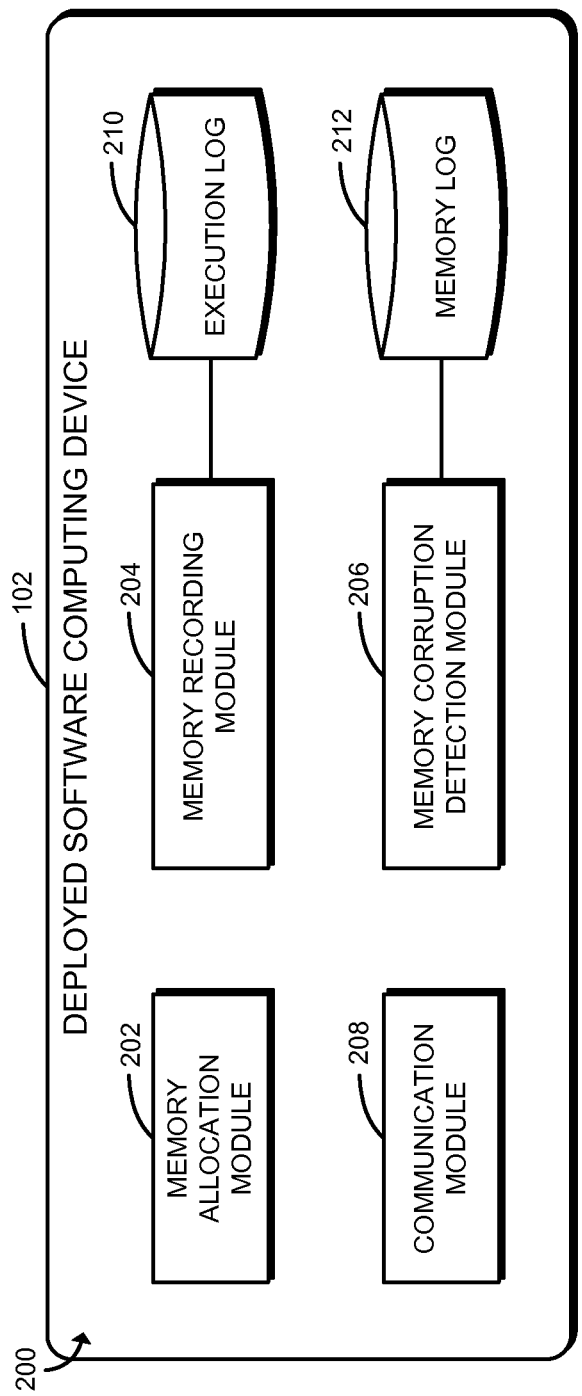
FIG. 2 is a simplified block diagram of at least one embodiment of an environment of the deployed software computing device of FIG. 1.

Referring now to FIG. 2, in use, the deployed software computing device 102 establishes an environment 200 for recording execution of a deployed software program. The illustrative environment 200 of the deployed software computing device 102 includes a memory allocation module 202, a memory recording module 204, a memory corruption detection module 206, and a communication module 208. The various modules of the environment 200 may be embodied as hardware, software, firmware, or a combination thereof. For example, the various modules, logic, and other components of the environment 200 may form a portion of, or otherwise be established by, the processor 110 or other hardware components of the deployed software computing device 102. As such, in some embodiments, one or more of the modules of the environment 200 may be embodied as a circuit or collection of electrical devices (e.g., a memory allocation circuit, a memory recording circuit, a memory corruption circuit, and/or a communication circuit). Additionally, in some embodiments, one or more of the illustrative modules may form a portion of another module and/or one or more of the illustrative modules may be embodied as a standalone or independent module.

The memory allocation module 202 is configured to allocate memory based on the memory requests and deletions of an executing program. Further, in some embodiments, the memory allocation module 202 may compile the program to ensure that a particular memory allocator or allocation algorithm is utilized. For example, in the illustrative embodiment, the memory allocation module 202 may compile the program to ensure that a "least recently used" (LRU) memory allocator is utilized for such memory requests and deletions. In order to do so, the memory allocation module 202 may, for example, overload an existing memory allocator of the program. However, in other embodiments, the memory allocation module 202 may allocate memory based on a "most recently used" (MRU) memory allocation algorithm.

It should be appreciated that most memory allocators (e.g., "free stores") allocate memory using an MRU memory allocation algorithm. Memory allocation algorithms often involve the generic steps of a memory request (e.g., a call to "malloc( )"), memory taken (e.g., the return from "malloc( )"), and a memory return (e.g., a call to "free( )"). Memory allocation algorithms also frequently use a vector of linked lists in which each linked list in the vector is used to store blocks of a different size of memory. Each linked list may contain, for example, the remaining available blocks of a particular memory size. The memory blocks are returned to the corresponding linked list (e.g., to the "free store") when deleted/freed by the memory (e.g., via a call to "free( )"). With MRU memory allocation, the memory is returned to the "top" or "front" of the linked list or free store such that it is immediately reassigned based on the next memory request of memory of that size. It should be appreciated that MRU memory allocation is often used in order to improve efficiency or, more particularly, cache efficiency. For example, if the computing device is instructed to allocate memory of the same size as recently freed memory, it often makes sense to reuse the memory just freed because there is a significant likelihood that the memory is still active in L1 cache and, if so, a cache miss penalty may be avoided. However, MRU generally involves a large number of memory reassignments of particular memory addresses, which potentially results in a large number of false positives when attempting to identify the root cause of a use-after-free memory corruption bugs associated with a particular memory address. On the other hand, LRU memory allocation algorithms return memory to the "bottom" or "tail" of the linked list or free store (not to the "top") to ensure that reassignment of memory occurs with a lower frequency than with traditional MRU memory allocation (e.g., the lowest frequency possible). It should be appreciated that using LRU memory allocation instead of MRU memory allocation reduces the number of root cause false positives resulting from memory reassignments. For example, in some embodiments, an LRU memory allocation algorithm may reduce the number of memory reassignments by a number proportional to the size of the corresponding linked list for a particular memory size.

The memory recording module 204 records execution of the program to an execution log 210. In some embodiments, the execution log 210 may be embodied as an ordered set of instructions of the program executed to result in the use-after-free memory corruption bug. In the illustrative embodiment, the memory recording module 204 utilizes a memory race recorder (e.g., Intel® MRR) to deterministically record at runtime the execution of the program, which may be either single-threaded or multi-threaded. However, in other embodiments, the memory recording module 204 may otherwise record the execution of the program to the execution log 210 in a manner suitable for performing the functions described herein. In some embodiments, the memory recording module 204 may utilize a chunk-based MRR system to deterministically record logical groupings of multiple, sequential instructions. It should be appreciated that the memory recording module 204 may handle various sources of non-determinism in recording the execution of the program. For example, the memory recording module 204 may handle input non-determinism (e.g., associated with reading and replaying a clock) and shared memory non-determinism (e.g., associated with multiple threads sharing the same memory) in some embodiments. In the illustrative embodiment, it should be appreciated that the execution log 210 may be transmitted to the replay computing device 106 (e.g., via the communication module 208) to permit the replay computing device 106 to replay the execution of the program deterministically.

The memory corruption detection module 206 monitors the execution of the program for an occurrence of use-after-free memory corruption bugs and records a memory address associated with the memory corruption to a memory log 212. For example, the memory corruption detection module 206 may utilize Intel® Memory Corruption Detection (MCD) technology to "trap" the effect of the use-after-free memory corruption bug and log the corresponding memory address. In some embodiments, the occurrence of a use-after-free bug may cause the memory corruption detection module 206 (e.g., Intel® MCD technology) to interrupt, which is indicative of the memory address associated with use-after-free bug. In particular, the memory corruption detection module 206 may process the execution log 210 in order to determine the instruction count across the threads (e.g., the total instruction count for the memory corruption instruction) and/or otherwise identify the corresponding memory access that caused the use-after-free bug. It should be appreciated that each of the execution log 210 and the memory log 212 may be embodied as any data structure suitable for the performance of the functions described herein. Further, in some embodiments, the execution log 210 and/or the memory log 212 may be stored remotely (e.g., for subsequent access by the replay computing device 106).

The communication module 208 handles the communication between the deployed software computing device 102 and remote devices (e.g., the replay computing device 106) through the network 104. For example, as described herein, the communication module 208 transmits the execution log 210 and the memory log 212 to the replay computing device 106. Additionally, in some embodiments, the deployed software computing device 102 may also transmit the deployed software program (e.g., in compiled or uncompiled format) to the replay computing device 106 for replay. In other embodiments, deployed software computing device 102 may identify the program (or a location of the program) so that the replay computing device 106 may instead retrieve the program itself for analysis.

Figure 3:
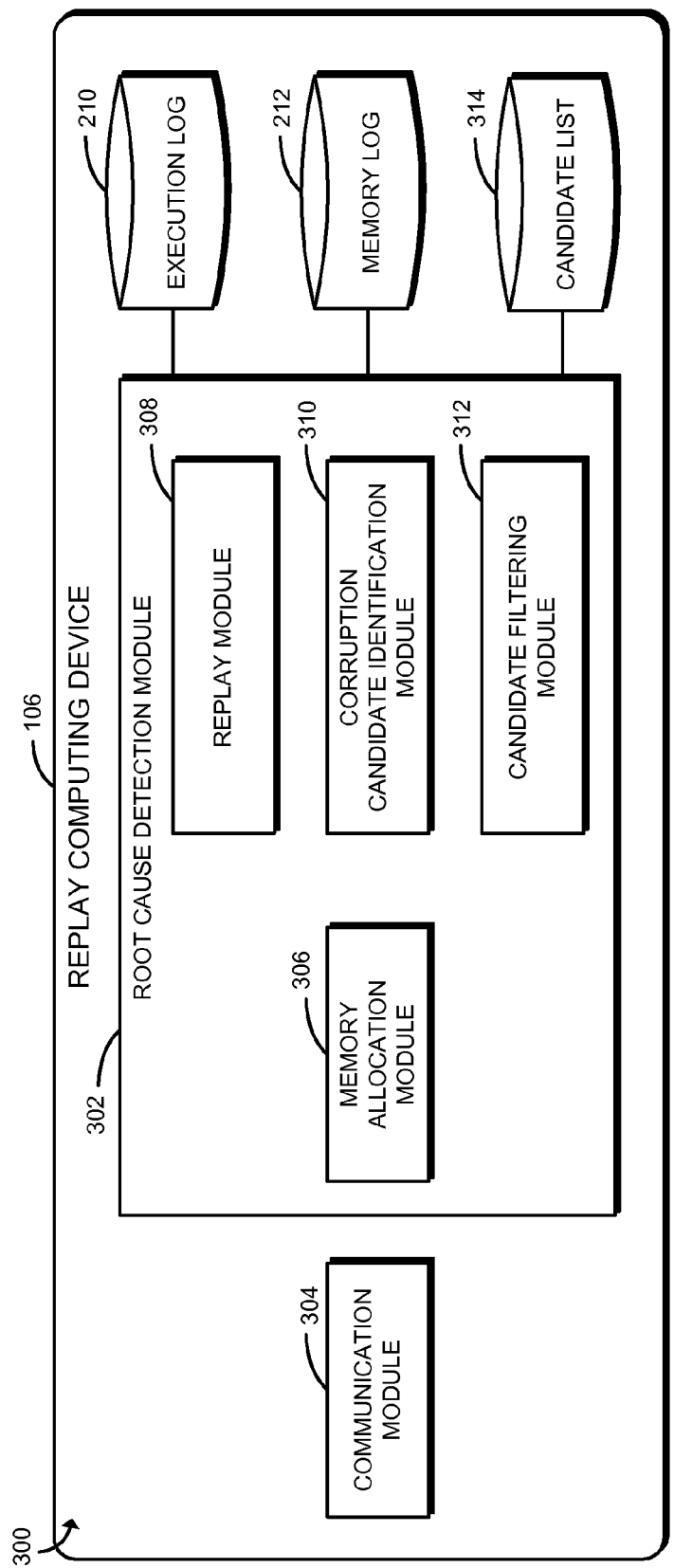
FIG. 3 is a simplified block diagram of at least one embodiment of an environment of the replay computing device of FIG. 1.

Referring now to FIG. 3, in use, the replay computing device 106 establishes an environment 300 for identifying a potential root cause of a use-after-free memory corruption bug of a program. The illustrative environment 300 of the replay computing device 106 includes a root cause detection module 302 and a communication module 304. Additionally, the illustrative root cause detection module 302 includes a memory allocation module 306, a replay module 308, a corruption candidate identification module 310, and a candidate filtering module 312. The various modules of the environment 300 may be embodied as hardware, software, firmware, or a combination thereof. For example, the various modules, logic, and other components of the environment 300 may form a portion of, or otherwise be established by, the processor 150 or other hardware components of the replay computing device 106. As such, in some embodiments, one or more of the modules of the environment 300 may be embodied as a circuit or collection of electrical devices (e.g., a root cause detection circuit, a communication circuit, a memory allocation circuit, a replay circuit, a corruption candidate identification circuit, and/or a candidate filtering circuit). Additionally, in some embodiments, one or more of the illustrative modules may form a portion of another module and/or one or more of the illustrative modules may be embodied as a standalone or independent module.

The root cause detection module 302 is configured to replay the program of the deployed software computing device 102 and identify potential root cause candidates (i.e., instructions) of the use-after-free memory corruption bugs. As discussed above, in the illustrative embodiment, the root cause detection module 302 includes the memory allocation module 306, the replay module 308, the corruption candidate identification module 310, and the candidate filtering module 312.

The memory allocation module 306 may be similar to the memory allocation module 202 of the deployed software computing device 102. Accordingly, in the illustrative embodiment, the memory allocation module 306 is configured to allocate memory based on the memory requests and deletions of an executing program. Further, in some embodiments, the memory allocation module 306 may compile the program to ensure that a particular memory allocator or allocation algorithm (e.g., LRU) is utilized, for example, by overloading an existing memory allocator of the program. It should be appreciated that, in some embodiments, the deployed software program may be received from the deployed software computing device 102 in a compiled format having the desired characteristics (e.g., an LRU memory allocator) in which case it may be unnecessary to re-compile the program.

The replay module 308 is configured to replay execution of the program based on the execution log 210 received from the deployed software computing device 102. As discussed above, the execution log 210 permits the replay module 308 to execute the program in the same manner in which it was executed by the deployed software computing device 102 (e.g., deterministically). In some embodiments, the replay module 308 may replay the execution of the program using a binary instrumentation technology (e.g., Intel® PIN technology).

The corruption candidate identification module 310 monitors memory operations (i.e., during replay) and compares memory address accesses of the executing program to the memory address associated with an occurrence of the use-after-free memory corruption bug (e.g., from the memory log 212). In the illustrative embodiment, if there is a match, the corruption candidate identification module 310 records the memory address access as a candidate for the root cause to a candidate list 314. For example, if the corruption candidate identification module 310 determines that a memory location being deleted overlaps with a memory location that the memory log 212 associates with a use-after-free bug, the corruption candidate identification module 310 records the corresponding memory access (e.g., the particular instruction) as a potential candidate for the root cause of the use-after-free bug (e.g., the potential "free" that caused the bug). It should be appreciated that the corruption candidate identification module 310 may record a variety of information regarding the memory access depending on the particular embodiment. For example, the corruption candidate identification module 310 may record the corresponding call stack, instruction pointer, instruction type, memory address, symbolic information, and/or other useful information. It should further be appreciated that the candidate list 314 may be embodied as any data structure suitable for the performance of the functions described herein.

It should be appreciated that the candidate list 314 may be provided to a programmer to reduce the work required by the programmer to identify the root cause of the use-after-free memory corruption bug. For example, the programmer may only have to analyze a few lines of code rather than the hundreds, thousands, or even millions of lines of code often required. Further, in the illustrative embodiment, the candidate filtering module 312 may filter the candidate list 314 in order to reduce the number of root cause candidates (e.g., automatically). For example, the candidate filtering module 312 may iteratively replay the program and remove those candidates determined not to be the root cause of the bug. In particular, in the illustrative embodiment, the candidate filtering module 312 may remove one or more instructions associated with a particular root cause candidate (e.g., the memory access itself or a nearby branch instruction), replay the modified program (i.e., without the removed instructions), and determine whether a use-after-free bug is still present in the modified program as described herein. If the use-after-free bug is still present, the selected candidate may be removed from the candidate list 314 (or otherwise annotated) as those instructions are unrelated to the use-after-free bug.

The communication module 304 handles the communication between the replay computing device 106 and remote devices (e.g., the deployed software computing device 102) through the network 104. For example, as described herein, the communication module 304 may receive the execution log 210, the memory log 212, and/or the deployed software program from the deployed software computing device 102.

Figure 4:
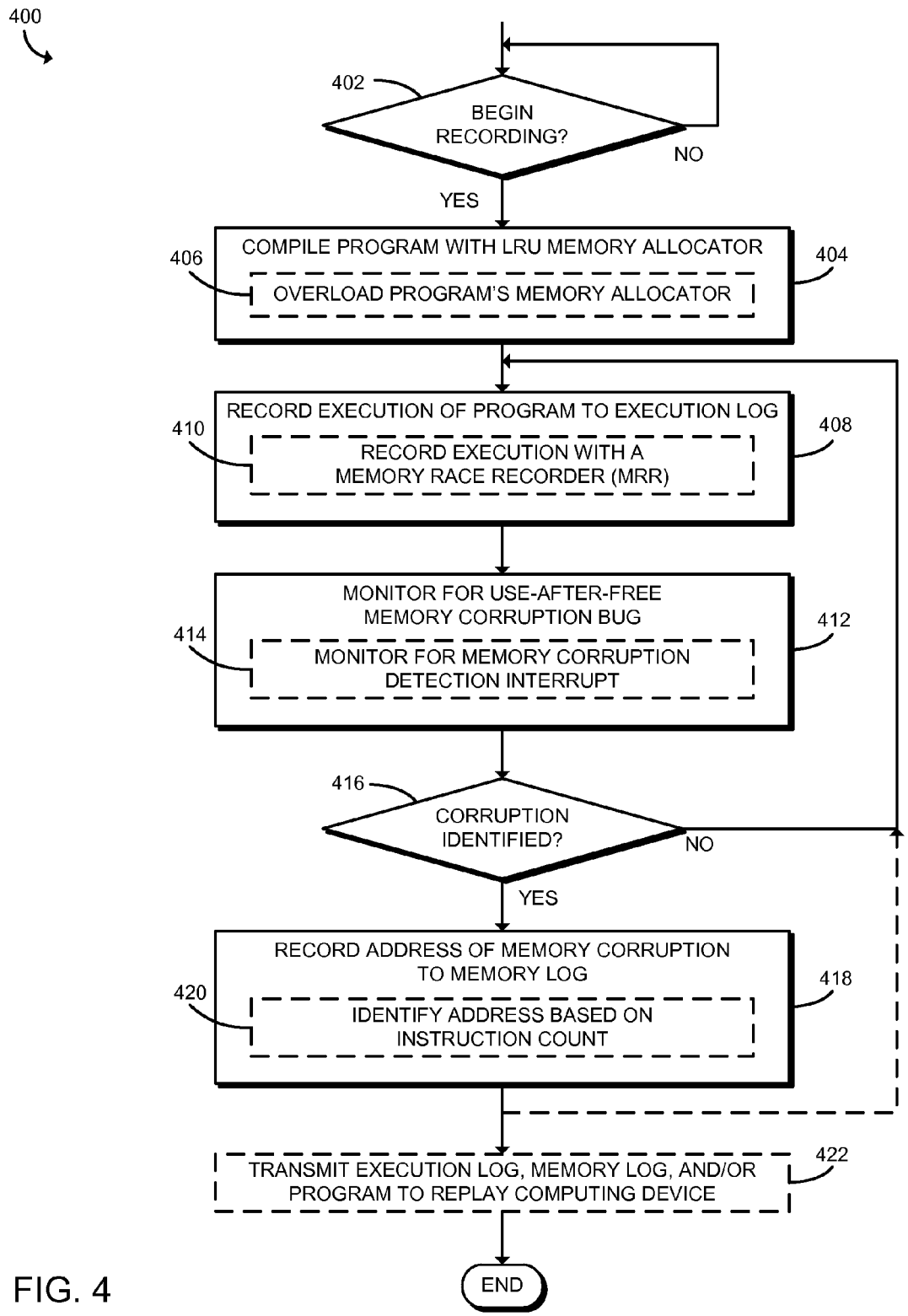
FIG. 4 is a simplified flow diagram of at least one embodiment of a method for recording execution of a program that may be executed by the deployed software computing device of FIG. 1.

Referring now to FIG. 4, in use, the deployed software computing device 102 may execute a method 400 for recording execution of a program. The illustrative method 400 begins with block 402 in which the computing device 102 determines whether to begin recording execution of the program. If so, the computing device 102 may compile the program with an LRU memory allocator in block 406. To do so, the computing device 102 may overload the program's memory allocator in some embodiments. As discussed above, in some embodiments, the program may already be compiled to utilize an LRU memory allocator or another desired memory allocator in which case the computing device 102 may determine not to re-compile the program.

In block 408, the computing device 102 records execution of the program to the execution log 210. In doing so, in block 410, the computing device 102 may record execution with a memory race recorder (e.g., Intel® MRR). As described above, it should be appreciated that the execution log 210 may permit the replay computing device 106 to replay the execution of the program in the same manner as executed by the deployed software computing device 102. In block 412, the computing device 102 monitors the execution of the program for occurrences of use-after-free bugs. For example, in block 414, the computing device 102 may monitor the execution of the program (e.g., with Intel® MCD) to determine whether an interrupt associated with a use-after-free bug is triggered.

In block 416, the computing device 102 determines whether a use-after-free memory corruption bug has been identified (e.g., based on a triggered interrupt). If so, the computing device 102 records the memory address associated with the use-after-free memory corruption bug to the memory log 212 in block 418. It should be appreciated that the computing device 102 may identify the occurrence of the use-after-free bug and record the corresponding memory address (i.e., the memory address affected by the bug) using any suitable technique and/or algorithm depending on the particular embodiment. For example, in block 420, the computing device 102 may identify the memory address of the use-after-free bug based on an instruction count of the memory corruption instruction (e.g., the total instruction count across all threads). Depending on the particular embodiment, the computing device 102 may continue execution to attempt to identify other use-after-free bugs or terminate the method 400 (e.g., to resolve the identified bug prior to continuing use-after-free debugging).

In block 422, the computing device 102 may transmit the execution log 210, the memory log 212, and/or the program to the replay computing device 106. As discussed above, the program may be transmitted in a compiled or uncompiled format depending on the particular embodiment. Further, in some embodiments, the execution log 210, the memory log 212, and/or the program may be transmitted to a different remote computing device (e.g., in a cloud computing environment) for subsequent access by the replay computing device 106.

Figure 5:
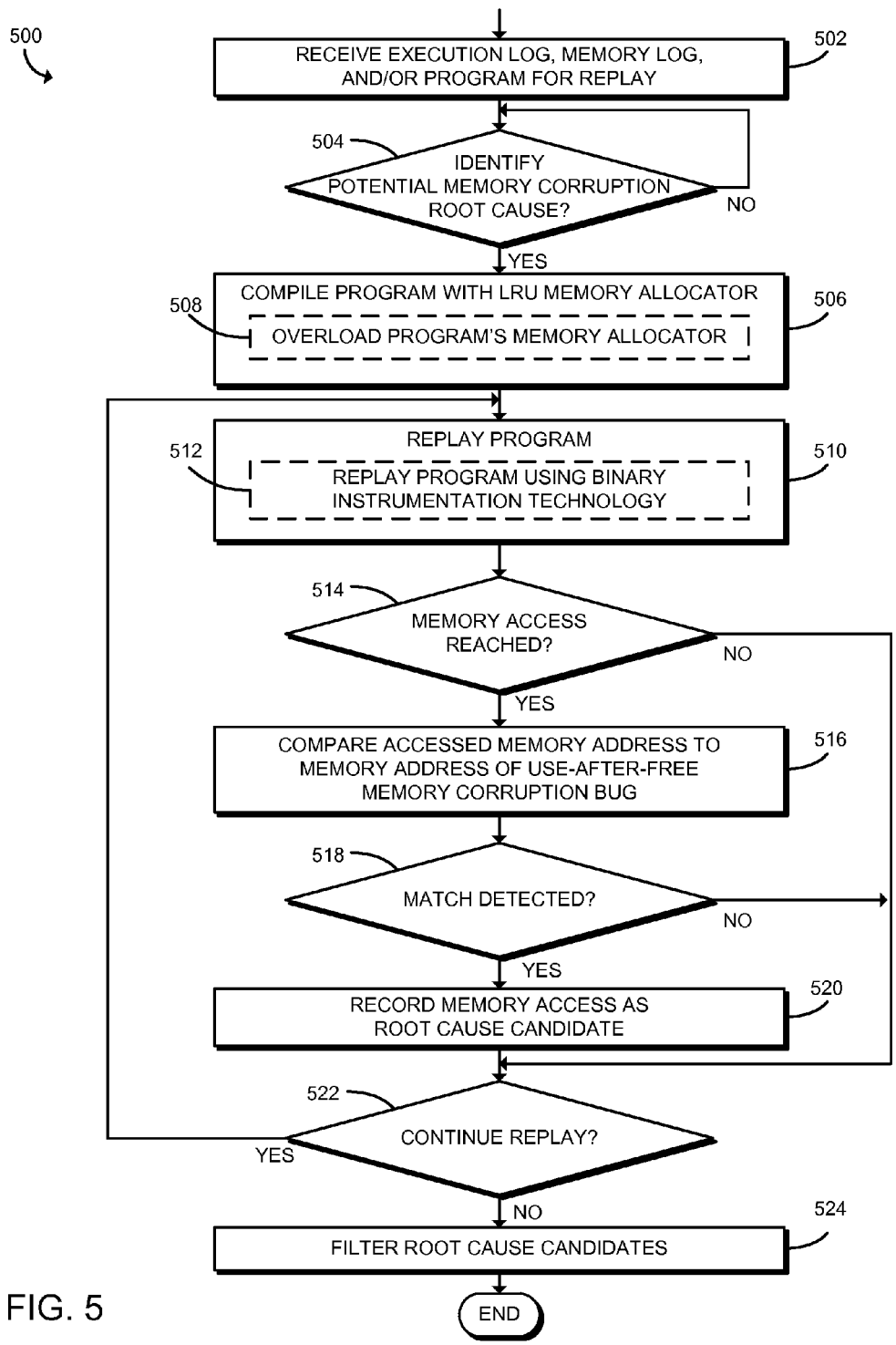
FIG. 5 is a simplified flow diagram of at least one embodiment of a method for identifying a potential root cause of a use-after-free memory corruption bug of a program that may be executed by the replay computing device of FIG. 1.

Referring now to FIG. 5, in use, the replay computing device 106 may execute a method 500 for identifying a potential root cause of a use-after-free memory corruption bug of a program. The illustrative method 500 begins with block 502 in which the computing device 106 receives the execution log 210, the memory log 212, and the deployed software program. As discussed above, in some embodiments, the computing device 106 may receive one or more of the logs 210, 212 or the program directly from the deployed software computing device 102, whereas in other embodiments, the computing device 106 may receive one or more of the logs 210, 212 or the program from another remote computing device. Further, in embodiments in which the computing devices 102, 106 are embodied as the same device, the logs 210, 212 and the program may be retrieved from the corresponding memory or data storage of the device.

In block 504, the computing device 106 determines whether to identify one or more potential root causes of a use-after-free bug. If so, the computing device 106 may compile the program with an LRU memory allocator in block 506. As discussed above, in doing so, the computing device 106 may overload the program's current memory allocator with the desired LRU memory allocator in block 508. Of course, in some embodiments, the computing device 106 may desire to utilize a different memory allocator in which case the program may be recompiled with that particular memory allocator. Further, in some embodiments, the program may be received in a compiled format that is already utilizing the desired compiler in which case the computing device 106 may determine not to recompile.

In block 510, the computing device 106 begins to replay the program. It should be appreciated that the computing device 106 may replay the execution of the program using any technique or mechanism suitable for performing the functions described herein. For example, in block 512, the computing device 106 may replay the execution of the program using a binary instrumentation technology such as Intel® PIN technology (e.g., to permit a controlled execution of the program). As described above, in the illustrative embodiment, the computing device 106 replays the execution of the program in the same manner in which it was executed by the deployed software computing device 102 (e.g., the same memory accesses, etc.).

In block 514, the computing device 106 determines whether a memory access (e.g., a load or store memory operation) has been reached/detected during the execution of the program. If not, the method 500 advances to block 522 (described below) in which the computing device 106 determines whether to continue the replay of the program. However, if a memory access has been reached/detected, the computing device 106 compares the accessed memory address to the memory address of the use-after-free memory corruption bug as indicated in the memory log 212 in block 516. Of course, in some embodiments, the deployed software computing device 102 may have identified multiple use-after-free memory corruption bugs in which case, the replay computing device 106 may compare the accessed memory address to the memory address associated with multiple bugs indicated in the memory log 212 (e.g., each of them).

In block 518, the computing device 106 determines whether a match has been detected between the accessed memory address and the memory address corresponding with the use-after-free memory corruption bug. If so, in block 520, the computing device 106 records the memory access (e.g., the particular instruction(s)) as a candidate for being the root cause of the use-after-free memory corruption bug. As described above, the computing device 106 may record the memory access to the candidate list 314. In doing so, the computing device 106 may record the corresponding call stack, instruction pointer, instruction type, memory address, symbolic information, and/or other useful information associated with the matching memory access.

Regardless of whether a match was detected, in block 522, the computing device 106 determines whether to continue to replay execution of the program. If so, the method 500 returns to block 510 in which the computing device 106 continues to replay the program. As such, in some embodiments, the computing device 106 replays the execution of the program until all of the potential candidates for the root cause of the use-after-free memory corruption bug (e.g., the matching memory accesses) have been identified and recorded to the candidate list 314. As such, the candidate list 314 may serve as a list of potential root causes of the use-after-free memory corruption bug. As discussed above, in some embodiments, the candidate list 314 may be provided to a programmer, which may reduce the work required by the programmer to identify the root cause of the useafter-free memory corruption bug (e.g., by reducing the number of lines of code that the programmer must look at). However, in the illustrative embodiment, in block 524, the computing device 106 filters the root cause candidates of the candidate list 314 to reduce the total number of root cause candidates. In other words, the computing device 106 may automatically reduce the number of root cause candidates to further reduce the amount of work required by the programmer in debugging use-after-free bugs.

Figure 6:
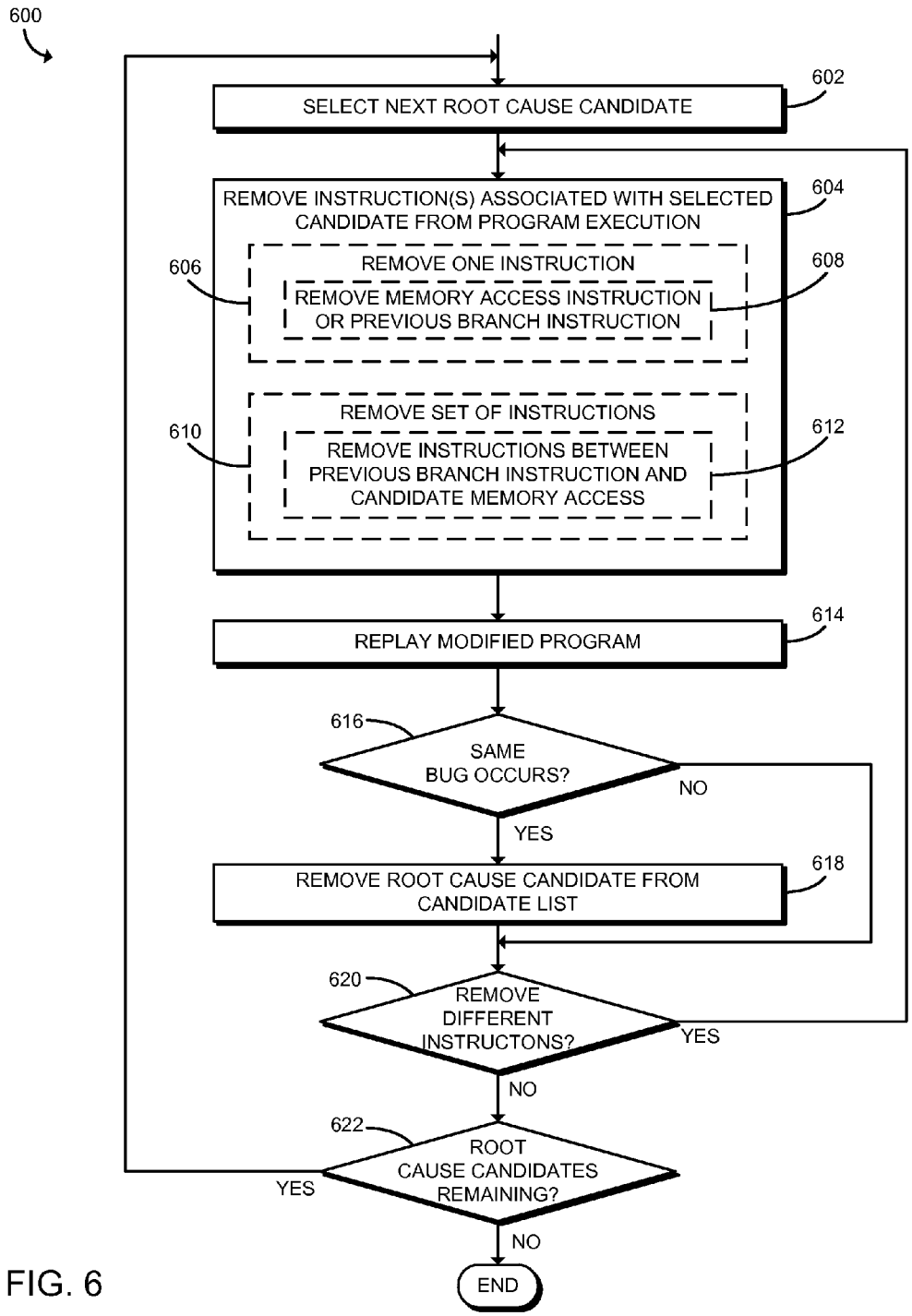
FIG. 6 is a simplified flow diagram of at least one embodiment of a method for filtering a candidate list of root cause candidates that may be executed by the replay computing device of FIG. 1.

To do so, the computing device 106 may execute a method 600 as described in FIG. 6. In the illustrative embodiment, the method 600 begins with block 602 in which the computing device 106 selects the next root cause candidate from the candidate list 314. That is, the computing device 106 selects one of the memory accesses determined to be directed to the memory address corresponding with the use-after-free memory corruption bug. It should be appreciated that the computing device 106 may select any (e.g., the first) root cause candidate from the candidate list 314 in the first occurrence of block 602 and what constitutes the "next" candidate may vary depending on the particular embodiment.

In block 604, the computing device 106 removes or otherwise prevents execution of one or more instructions associated with the selected candidate from the program execution. It should be appreciated that the computing device 106 may remove the instructions and/or prevent the instructions from executing using any suitable technique or algorithm. For clarity of the description, the prevention of execution of the selected instructions may be referred to herein as "removal" of the instructions regardless of the technique employed for preventing execution of those instructions. Further, the computing device 106 may similarly determine which instructions to remove using any suitable technique or algorithm. For example, in block 606, the computing device 106 may remove only a single instruction. In particular, in block 608, the computing device 106 may remove the memory access instruction itself or a previous branch instruction (e.g., a most recent branch instruction executed prior to the selected candidate memory access instruction). Alternatively, in block 610, the computing device 106 may remove a set of instructions (i.e., more than one) associated with the selected candidate. For example, in block 612, the computing device 106 may remove the instructions defined between the previous branch instruction and the candidate memory access instruction. As indicated above, the particular instruction(s) removed by the computing device 106 may vary depending on the particular embodiment. In some embodiments, the computing device 106 identifies "chunks" of operations related to one another in determining a set of instructions to remove associated with the memory access instruction (e.g., groups of code associated with a memory "free" or "delete" operation).

It should be appreciated that the program with the selected instruction(s) removed may be referring to herein as a "modified" program or modified version of the program. In block 614, the computing device 106 replays execution of the program based on the modified version of the program. In the illustrative embodiment, the program is executed in the same manner as the unmodified program except that the removed instructions are not executed. In block 616, the computing device 106 determine whether replay of the modified program results in the occurrence of the same use-after-free memory corruption bug. It should be appreciated that, depending on the particular instructions removed, the replay may result in the occurrence of the same use-after-free memory corruption bug, the occurrence of a different bug (e.g., a different use-after-free memory corruption bug), or no bug. If the computing device 106 determines that replay of the modified program results in the same use-after-free memory corruption bug, in block 618, the computing device 106 removes the root cause candidate from the candidate list 314. In other words, if the same use-after-free bug occurs with or without execution of the selected instructions, an assumption is made that those instructions are unrelated to the occurrence of the bug. However, if the use-after-free bug still occurs, the instructions are likely related in some way to the root cause of the bug, although they are not necessarily the root cause themselves. As such, the candidate is kept in the candidate list 314. Further, if the replay of the modified program results in the occurrence of a different bug, it is unclear whether the instructions are related to the use-after-free bug and the candidate is therefore also kept in the candidate list 314.

In block 620, the computing device 106 determines whether to, additionally or alternatively, remove different instructions from the replay of the program. If so, the method 600 returns to block 604 in which the computing device 106 selects one or more instructions associated with the selected candidate for removal and the modified program is replayed again to determine whether those instructions are related to the use-after-free bug. However, if the computing device 106 determines not to remove different instructions, in block 622, the computing device 106 determines whether any root cause candidates are remaining in the candidate list 314. If so, the method 600 returns to block 602 in which the computing device 106 selects the next root cause candidate from the candidate list 314. In other words, the computing device 106 iteratively replays the program based on the removal of various instructions related to the root cause candidates identified in the candidate list 314 to automatically determine (i.e., without programmer intervention) which candidates are likely unrelated to the occurrence of the use-after-free memory corruption bug. In some embodiments, the computing device 106 may iterate through each of the one-instruction omissions (e.g., removing each candidate memory access and/or previous branch instruction sequentially) prior to iterating through sets of instructions. Further, in some embodiments, the computing device 106 may remove the instruction(s) associated with multiple candidates of the candidate list 314 simultaneously and replay the execution of the modified program as described herein. It should be appreciated that execution of the methods 500 and 600 often results in a number of root cause candidates significantly less than the number of memory accesses that a programmer must consider without employing the techniques described herein.

Examples

Illustrative examples of the technologies disclosed herein are provided below. An embodiment of the technologies may include any one or more, and any combination of, the examples described below.

Example 1 includes a computing device for identification of a potential root cause of a use-after-free memory corruption bug of a program, the computing device comprising a replay module to replay execution of the program based on an execution log of the program, wherein the execution log comprises an ordered set of executed instructions of the program that resulted in the use-after-free memory corruption bug; a corruption candidate identification module to (i) compare a use-after-free memory address access of the program to a memory address associated with an occurrence of the use-after-free memory corruption bug in response to detection of the use-after-free memory address access and (ii) record, to a candidate list, the use-after-free memory address access of the program as a candidate for a root cause of the use-after-free memory corruption bug in response to detection of a match between the use-after-free memory address access of the program and the memory address associated with the occurrence of the use-after-free memory corruption bug.

Example 2 includes the subject matter of Example 1, and further including a candidate filtering module to filter the candidate list to reduce a number of candidates in the candidate list.

Example 3 includes the subject matter of any of Examples 1 and 2, and wherein to filter the candidate list comprises to select a candidate from the candidate list; remove one or more instructions associated with the selected candidate from the execution of the program to generate a modified program; replay the modified program; and remove the selected candidate from the candidate list in response to a determination that replay of the modified program results in the use-after-free memory corruption bug.

Example 4 includes the subject matter of any of Examples 1-3, and wherein the one or more instructions consists of a single instruction of the program.

Example 5 includes the subject matter of any of Examples 1-4, and wherein the one or more instructions consists of a most recent branch instruction of the program.

Example 6 includes the subject matter of any of Examples 1-5, and wherein the one or more instructions consists of an instruction that corresponds with the selected candidate memory access.

Example 7 includes the subject matter of any of Examples 1-6, and wherein the one or more instructions comprises a set of instructions of the program.

Example 8 includes the subject matter of any of Examples 1-7, and wherein the set of instructions comprises a set of instructions defined between a most recent branch instruction and an instruction that corresponds with the selected candidate memory access.

Example 9 includes the subject matter of any of Examples 1-8, and further including a memory allocation module to compile the program with a least recently used (LRU) memory allocator, wherein to replay the execution of the program comprises to replay the execution of the program in response to compilation of the program with the LRU memory allocator.

Example 10 includes the subject matter of any of Examples 1-9, and wherein to compile the program comprises to overload a memory allocator of the program.

Example 11 includes the subject matter of any of Examples 1-10, and wherein to replay the execution of the program comprises to replay the execution of the program with a binary instrumentation technology.

Example 12 includes a method for identifying a potential root cause of a use-after-free memory corruption bug of a program, the method comprising replaying, by a computing device, execution of the program based on an execution log of the program, wherein the execution log comprises an ordered set of executed instructions of the program that result in the use-after-free memory corruption bug; comparing, by the computing device, a use-after-free memory address access of the program to a memory address associated with an occurrence of the use-after-free memory corruption bug in response to detecting the use-after-free memory address access; and recording, by the computing device and to a candidate list, the use-after-free memory address access of the program as a candidate for the root cause of the use-after-free memory corruption bug in response to detecting a match between the use-after-free memory address access of the program and the memory address associated with the occurrence of the use-after-free memory corruption bug.

Example 13 includes the subject matter of Example 12, and further including filtering the candidate list to reduce a number of candidates in the candidate list.

Example 14 includes the subject matter of any of Examples 12 and 13, and wherein filtering the candidate list comprises selecting a candidate from the candidate list; removing one or more instructions associated with the selected candidate from the execution of the program to generate a modified program; replaying the modified program; and removing the selected candidate from the candidate list in response to determining that replaying the modified program results in the use-after-free memory corruption bug.

Example 15 includes the subject matter of any of Examples 12-14, and wherein removing the one or more instructions consists of removing a single instruction from the program.

Example 16 includes the subject matter of any of Examples 12-15, and wherein removing the one or more instructions consists of removing a most recent branch instruction from the program.

Example 17 includes the subject matter of any of Examples 12-16, and wherein removing the one or more instructions consists of removing an instruction that corresponds with the selected candidate memory access.

Example 18 includes the subject matter of any of Examples 12-17, and wherein removing the one or more instructions comprises removing a set of instructions from the program.

Example 19 includes the subject matter of any of Examples 12-18, and wherein removing the set of instructions comprises removing a set of instructions defined between a most recent branch instruction and an instruction corresponding with the selected candidate memory access.

Example 20 includes the subject matter of any of Examples 12-19, and further including compiling, by the computing device, the program with a least recently used (LRU) memory allocator, wherein replaying the execution of the program comprises replaying the execution of the program in response to compiling the program with the LRU memory allocator.

Example 21 includes the subject matter of any of Examples 12-20, and wherein compiling the program comprises overloading a memory allocator of the program.

Example 22 includes the subject matter of any of Examples 12-21, and wherein replaying the execution of the program comprises replaying the execution of the program with a binary instrumentation technology.

Example 23 includes a computing device comprising a processor; and a memory having stored therein a plurality of instructions that when executed by the processor cause the computing device to perform the method of any of Examples 12-22.

Example 24 includes one or more machine-readable storage media comprising a plurality of instructions stored thereon that, in response to execution by a computing device, cause the computing device to perform the method of any of Examples 12-22.

Example 25 includes a computing device for identification of a potential root cause of a use-after-free memory corruption bug of a program, the computing device comprising means for replaying execution of the program based on an execution log of the program, wherein the execution log comprises an ordered set of executed instructions of the program that result in the use-after-free memory corruption bug; means for comparing a use-after-free memory address access of the program to a memory address associated with an occurrence of the use-after-free memory corruption bug in response to detection of the use-after-free memory address access; and means for recording, to a candidate list, the use-after-free memory address access of the program as a candidate for the root cause of the use-after-free memory corruption bug in response to detection of a match between the use-after-free memory address access of the program and the memory address associated with the occurrence of the use-after-free memory corruption bug.

Example 26 includes the subject matter of Example 25, and further including means for filtering the candidate list to reduce a number of candidates in the candidate list.

Example 27 includes the subject matter of any of Examples 25 and 26, and wherein the means for filtering the candidate list comprises means for selecting a candidate from the candidate list; means for removing one or more instructions associated with the selected candidate from the execution of the program to generate a modified program; means for replaying the modified program; and means for removing the selected candidate from the candidate list in response to a determination that replaying the modified program results in the use-after-free memory corruption bug.

Example 28 includes the subject matter of any of Examples 25-27, and wherein the one or more instructions consists of a single instruction from the program.

Example 29 includes the subject matter of any of Examples 25-28, and wherein the one or more instructions consists of a most recent branch instruction from the program.

Example 30 includes the subject matter of any of Examples 25-29, and wherein the one or more instructions consists of an instruction that corresponds with the selected candidate memory access.

Example 31 includes the subject matter of any of Examples 25-30, and, wherein the one or more instructions comprises a set of instructions from the program.

Example 32 includes the subject matter of any of Examples 25-31, and wherein the set of instructions comprises a set of instructions defined between a most recent branch instruction and an instruction corresponding with the selected candidate memory access.

Example 33 includes the subject matter of any of Examples 25-32, and further including means for compiling the program with a least recently used (LRU) memory allocator, wherein the means for replaying the execution of the program comprises means for replaying the execution of the program in response to compiling the program with the LRU memory allocator.

Example 34 includes the subject matter of any of Examples 25-33, and wherein the means for compiling the program comprises means for overloading a memory allocator of the program.

Example 35 includes the subject matter of any of Examples 25-34, and wherein the means for replaying the execution of the program comprises means for replaying the execution of the program with a binary instrumentation technology.

Example 36 includes a computing device for recording execution of a program, the computing device comprising a memory recording module to record execution of the program to an execution log; and a memory corruption detection module to (i) monitor the execution of the program for an occurrence of a use-after-free memory corruption bug and (ii) record a memory address associated with the occurrence of the use-after-free memory corruption bug to a memory log.

Example 37 includes the subject matter of Example 36, and wherein to record the execution of the program comprises to record the execution of the program with a memory race recorder.

Example 38 includes the subject matter of any of Examples 36 and 37, and wherein to monitor the execution of the program comprises to monitor the execution of the program for an occurrence of a memory corruption detection interrupt triggered as a result of the occurrence of the use-after-free memory corruption bug.

Example 39 includes the subject matter of any of Examples 36-38, and wherein to record the memory address comprises to identify the memory address based on a number of instructions of the program executed prior to a memory corruption instruction associated with the occurrence of the use-after-free memory corruption bug.

Example 40 includes the subject matter of any of Examples 36-39, and further including a memory allocation module to compile the program with a least recently used (LRU) memory allocator, wherein to record the execution of the program comprises to record the execution of the program in response to compilation of the program with the LRU memory allocator.

Example 41 includes the subject matter of any of Examples 36-40, and wherein compiling the program comprises overloading a memory allocator of the program.

Example 42 includes a method for recording execution of a program of a computing device, the method comprising recording, by the computing device, execution of the program to an execution log; monitoring, by the computing device, the execution of the program for an occurrence of a use-after-free memory corruption bug; and recording, by the computing device, a memory address associated with the occurrence of the use-after-free memory corruption bug to a memory log.

Example 43 includes the subject matter of Example 42, and wherein recording the execution of the program comprises recording the execution of the program with a memory race recorder.

Example 44 includes the subject matter of any of Examples 42 and 43, and wherein monitoring the execution of the program comprises monitoring the execution of the program for an occurrence of a memory corruption detection interrupt triggered as a result of the occurrence of the use-after-free memory corruption bug.

Example 45 includes the subject matter of any of Examples 42-44, and wherein recording the memory address comprises identifying the memory address based on a number of instructions of the program executed prior to a memory corruption instruction associated with the occurrence of the use-after-free memory corruption bug.

Example 46 includes the subject matter of any of Examples 42-45, and further including compiling, by the computing device, the program with a least recently used (LRU) memory allocator, wherein recording the execution of the program comprises recording the execution of the program in response to compiling the program with the LRU memory allocator.

Example 47 includes the subject matter of any of Examples 42-46, and wherein compiling the program comprises overloading a memory allocator of the program.

Example 48 includes a computing device comprising a processor; and a memory having stored therein a plurality of instructions that when executed by the processor cause the computing device to perform the method of any of Examples 42-47.

Example 49 includes one or more machine-readable storage media comprising a plurality of instructions stored thereon that, in response to execution by a computing device, cause the computing device to perform the method of any of Examples 42-47.

Example 50 includes a computing device for recording execution of a program, the computing device comprising means for recording execution of the program to an execution log; means for monitoring the execution of the program for an occurrence of a use-after-free memory corruption bug; and means for recording a memory address associated with the occurrence of the use-after-free memory corruption bug to a memory log.

Example 51 includes the subject matter of Example 50, and wherein the means for recording the execution of the program comprises means for recording the execution of the program with a memory race recorder.

Example 52 includes the subject matter of any of Examples 50 and 51, and wherein the means for monitoring the execution of the program comprises means for monitoring the execution of the program for an occurrence of a memory corruption detection interrupt triggered as a result of the occurrence of the use-after-free memory corruption bug.

Example 53 includes the subject matter of any of Examples 50-52, and wherein the means for recording the memory address comprises means for identifying the memory address based on a number of instructions of the program executed prior to a memory corruption instruction associated with the occurrence of the use-after-free memory corruption bug.

Example 54 includes the subject matter of any of Examples 50-53, and further including means for compiling the program with a least recently used (LRU) memory allocator, wherein the means for recording the execution of the program comprises means for recording the execution of the program in response to compiling the program with the LRU memory allocator.

Example 55 includes the subject matter of any of Examples 50-54, and wherein the means for compiling the program comprises means for overloading a memory allocator of the program.

The invention claimed is:

1. A computing device for identification of a potential root cause of a use-after-free memory corruption bug of a program, the computing device comprising:
   a memory allocation module to compile the program with a least recently used (LRU) memory allocator;
   a replay module to replay execution of the program in response to compilation of the program and based on an execution log of the program, wherein the execution log comprises an ordered set of executed instructions of the program that resulted in the use-after-free memory corruption bug;
   a corruption candidate identification module to (i) compare a use-after-free memory address access of the program to a memory address associated with an occurrence of the use-after-free memory corruption bug in response to detection of the use-after-free memory address access and (ii) record, to a candidate list, the use-after-free memory address access of the program as a candidate for a root cause of the use-after-free memory corruption bug in response to detection of a match between the use-after-free memory address access of the program and the memory address associated with the occurrence of the use-after-free memory corruption bug.

2. The computing device of claim 1, further comprising a candidate filtering module to filter the candidate list to reduce a number of candidates in the candidate list.

3. The computing device of claim 2, wherein to filter the candidate list comprises to:
   select a candidate from the candidate list;
   remove one or more instructions associated with the selected candidate from the execution of the program to generate a modified program;
   replay the modified program; and
   remove the selected candidate from the candidate list in response to a determination that replay of the modified program results in the use-after-free memory corruption bug.

4. The computing device of claim 3, wherein the one or more instructions consists of a single instruction of the program.

5. The computing device of claim 3, wherein the one or more instructions consists of a most recent branch instruction of the program.

6. The computing device of claim 3, wherein the one or more instructions consists of an instruction that corresponds with the selected candidate memory access.

7. The computing device of claim 3, wherein the one or more instructions comprises a set of instructions of the program.

8. The computing device of claim 7, wherein the set of instructions comprises a set of instructions defined between a most recent branch instruction and an instruction that corresponds with the selected candidate memory access.

9. The computing device of claim 1, wherein to compile the program comprises to overload a memory allocator of the program.

10. The computing device of claim 1, wherein to replay the execution of the program comprises to replay the execution of the program with a binary instrumentation technology.

11. One or more non-transitory, machine-readable storage media comprising a plurality of instructions stored thereon that, in response to execution by a computing device, cause the computing device to:
   compile a program with a least recently used (LRU) memory allocator;
   replay execution of the program in response to compilation of the program and based on an execution log of the program, wherein the execution log comprises an ordered set of executed instructions of the program that result in the use-after-free memory corruption bug;
   compare a use-after-free memory address access of the program to a memory address associated with an occurrence of the use-after-free memory corruption bug in response to detecting the use-after-free memory address access; and
   record, to a candidate list, the use-after-free memory address access of the program as a candidate for the root cause of the use-after-free memory corruption bug in response to detecting a match between the use-after-free memory address access of the program and the memory address associated with the occurrence of the use-after-free memory corruption bug.

12. The one or more non-transitory, machine-readable storage media of claim 11, wherein the plurality of instructions further cause the computing device to:
- select a candidate from the candidate list;
- remove one or more instructions associated with the selected candidate from the execution of the program to generate a modified program;
- replay the modified program; and
- remove the selected candidate from the candidate list in response to a determination that replay of the modified program results in the use-after-free memory corruption bug.

13. The one or more non-transitory, machine-readable storage media of claim 12, wherein the one or more instructions consists of a most recent branch instruction from the program.

14. The one or more non-transitory, machine-readable storage media of claim 12, wherein the one or more instructions consists of an instruction that corresponds with the selected candidate memory access.

15. The one or more non-transitory, machine-readable storage media of claim 12, wherein the one or more instructions comprises a set of instructions defined between a most recent branch instruction and an instruction corresponding with the selected candidate memory access.

16. A method for identifying a potential root cause of a use-after-free memory corruption bug of a program, the method comprising:
- compiling, by the computing device, the program with a least recently used (LRU) memory allocator;
- replaying, by a computing device, execution of the program in response to compiling the program and based on an execution log of the program, wherein the execution log comprises an ordered set of executed instructions of the program that result in the use-after-free memory corruption bug;
- comparing, by the computing device, a use-after-free memory address access of the program to a memory address associated with an occurrence of the use-after-free memory corruption bug in response to detecting the use-after-free memory address access;
- recording, by the computing device and to a candidate list, the use-after-free memory address access of the program as a candidate for the root cause of the use-after-free memory corruption bug in response to detecting a match between the use-after-free memory address access of the program and the memory address associated with the occurrence of the use-after-free memory corruption bug.

17. The method of claim 16, further comprising filtering the candidate list to reduce a number of candidates in the candidate list.

18. The method of claim 17, wherein filtering the candidate list comprises:
- selecting a candidate from the candidate list;
- removing one or more instructions associated with the selected candidate from the execution of the program to generate a modified program;
- replaying the modified program; and
- removing the selected candidate from the candidate list in response to determining that replaying the modified program results in the use-after-free memory corruption bug.

19. A computing device for recording execution of a program, the computing device comprising:
- a memory allocation module to compile the program with a least recently used (LRU) memory allocator;
- a memory recording module to record execution of the program to an execution log in response to compilation of the program; and
- a memory corruption detection module to (i) monitor the execution of the program for an occurrence of a use-after-free memory corruption bug and (ii) record a memory address associated with the occurrence of the use-after-free memory corruption bug to a memory log.

20. The computing device of claim 19, wherein to monitor the execution of the program comprises to monitor the execution of the program for an occurrence of a memory corruption detection interrupt triggered as a result of the occurrence of the use-after-free memory corruption bug.

21. The computing device of claim 19, wherein to record the memory address comprises to identify the memory address based on a number of instructions of the program executed prior to a memory corruption instruction associated with the occurrence of the use-after-free memory corruption bug.

* * * * *